US010836283B2

(12) United States Patent
    Toda

(10) Patent No.: US 10,836,283 B2
(45) Date of Patent: Nov. 17, 2020

(54) SEAT LOCK DEVICE

(71) Applicant: TACHI-S CO., LTD., Tokyo (JP)

(72) Inventor: Naoki Toda, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/388,297

(22) Filed: Apr. 18, 2019

(65) Prior Publication Data

US 2019/0389340 A1      Dec. 26, 2019

(30) Foreign Application Priority Data

Jun. 26, 2018  (JP) ................................. 2018-121342

(51) Int. Cl.
    *B60N 2/427*       (2006.01)
    *B60N 2/433*       (2006.01)
(52) U.S. Cl.
    CPC ......... *B60N 2/42709* (2013.01); *B60N 2/433* (2013.01)
(58) Field of Classification Search
    None
    See application file for complete search history.

(56) References Cited

U.S. PATENT DOCUMENTS

| 6,109,690 A * | 8/2000 | Wu ...................... | B60N 2/4228 297/216.13 |
|---|---|---|---|
| 2008/0217932 A1* | 9/2008 | Yamada ................ | E05B 85/045 292/340 |
| 2008/0315635 A1 | 12/2008 | Kimura et al. | |
| 2011/0187171 A1* | 8/2011 | Ishii ......................... | B60N 2/22 297/354.12 |
| 2012/0062015 A1* | 3/2012 | Tanaka ................... | B60N 2/366 297/463.1 |
| 2014/0138979 A1* | 5/2014 | Tanaka ................. | B60N 2/2245 296/65.03 |
| 2015/0014999 A1* | 1/2015 | Fujii ..................... | E05B 85/045 292/92 |

FOREIGN PATENT DOCUMENTS

JP        2009-001209 A      1/2009

* cited by examiner

*Primary Examiner* — David E Allred
(74) *Attorney, Agent, or Firm* — Paratus Law Group, PLLC

(57) ABSTRACT

A seat lock device includes: a striker installed in a vehicle body; and a lock unit provided on a seat back tiltable in a seat front-rear direction and holding the seat back in a standing state by locking the striker. The striker includes a base bracket attached to the vehicle body and a U-shaped rod locked by the lock unit, the base bracket has two support portions which respectively support end portions of the rod with a space therebetween in the seat front-rear direction, and at least one of the support portions deforms when a load exceeding a predetermined load is input to the rod so as to permit movement of the end portion of the rod supported by the support portion with respect to the base bracket.

5 Claims, 11 Drawing Sheets

SEAT LOCK DEVICE

CROSS-REFERENCE TO RELATED APPLICATION(S)

This application is based upon and claims the benefit of priority from Japanese Patent Application No. 2018-121342, filed on Jun. 26, 2018, the entire contents of which are incorporated herein by reference.

BACKGROUND

1. Field of the Invention

The present invention relates to a seat lock device.

2. Description of the Related Art

As a seat installed in a vehicle such as an automobile, a seat has been known in which, from the viewpoint of protecting an occupant at the time of a vehicle collision, a part of the seat is deformed by a load applied to the seat at the time of a vehicle collision, thereby alleviating an impact applied to the occupant.

For example, a seat described in JP-A-2009-1209 includes a rear collision impact absorbing unit used for a reclining device which makes a seat back inclined with respect to a seat cushion. The rear collision impact absorbing unit is provided with one side member rotated synchronously with any one side of a seat back side or a seat cushion side between mutually pivoting members and the other side member rotated synchronously with the other side in order to enable inclination motion of the seat back. In rear collision impact absorbing unit, a convex portion is provided on the one side member and a concave portion to be fitted with the convex portion is provided on the other side member. When a load is applied, the convex portion and the concave portion are relatively pivoted and deformed in a state of being fitted, whereby the impact is absorbed.

An impact absorption technology of a seat is mainly applied to a front seat of a vehicle. However, application to a rear seat is required to improve an occupant protection performance. Here, in many rear seats, a seat back is tiltable with respect to a seat cushion, but it is arranged in either a reclined state or a standing state. The seat back placed in the standing state is fixed to a vehicle body by a seat lock device.

This type of rear seat does not have a reclining device which fixes the seat back in a tiltable manner at various angles with respect to the seat cushion. The impact absorbing unit described in JP-A-2009-1209 cannot be applied to a seat not equipped with a reclining device and lacks versatility.

SUMMARY

An object of the invention is to improve occupant protection performance in a seat on which a tiltable seat back is fixed to a vehicle body by a seat lock device by absorbing an impact using the seat lock device.

According to an aspect of the invention, there is provided a seat lock device including: a striker installed in a vehicle body; and a lock unit provided on a seat back tiltable in a seat front-rear direction and holding the seat back in a standing state by locking the striker, wherein: the striker includes a base bracket attached to the vehicle body and a U-shaped rod locked by the lock unit; the base bracket has two support portions which respectively support end portions of the rod with a space therebetween in the seat front-rear direction; and at least one of the support portions deforms when a load exceeding a predetermined load is input to the rod so as to permit movement of the end portion of the rod supported by the support portion with respect to the base bracket.

According to the aspect of the invention, it is possible to improve occupant protection performance in a seat on which a tiltable seat back is fixed to a vehicle body by a seat lock device by absorbing an impact using the seat lock device.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
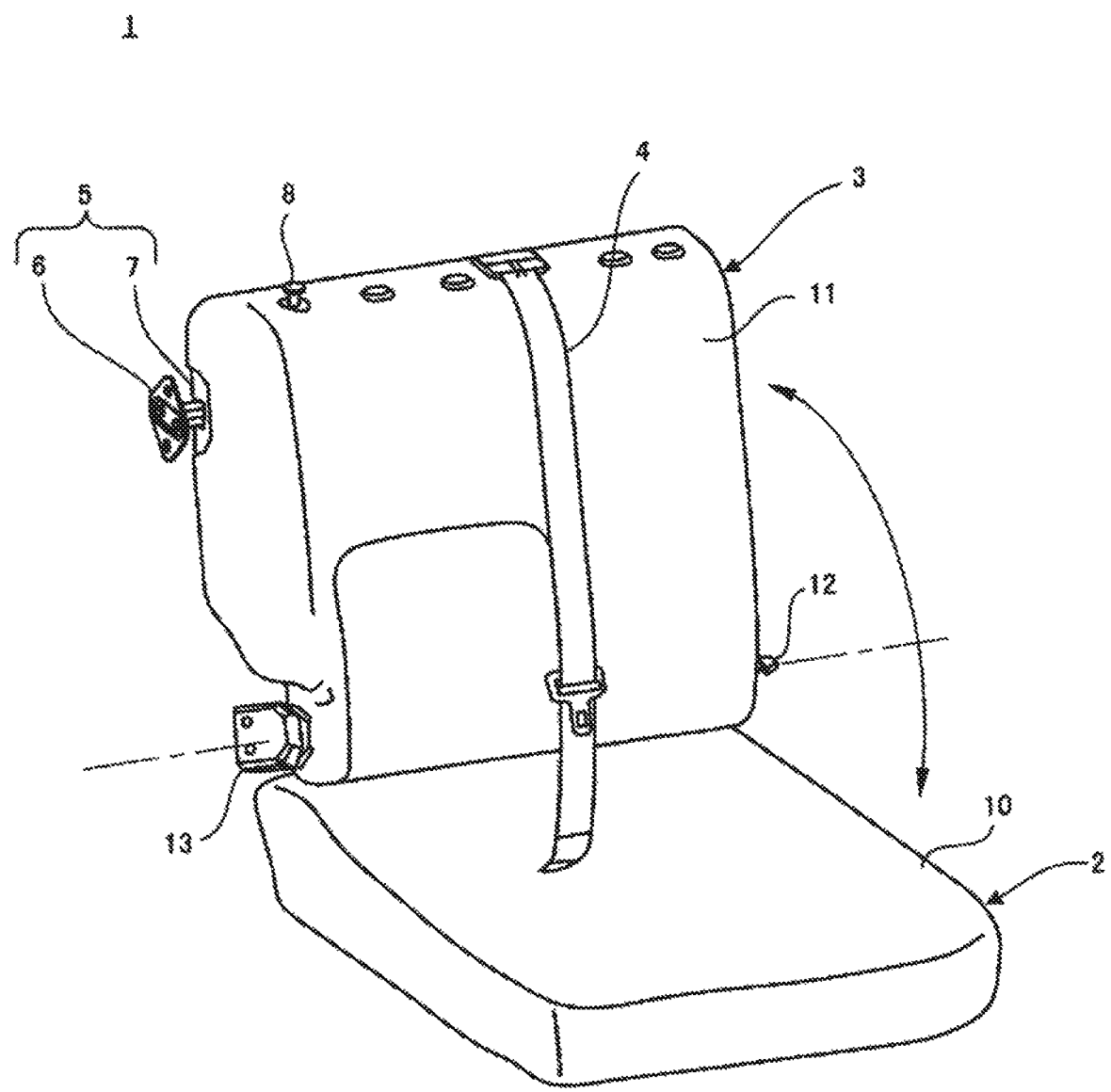
FIG. 1 is a perspective view illustrating an example of a seat for a vehicle for explaining an embodiment of the invention.
Figure 2:
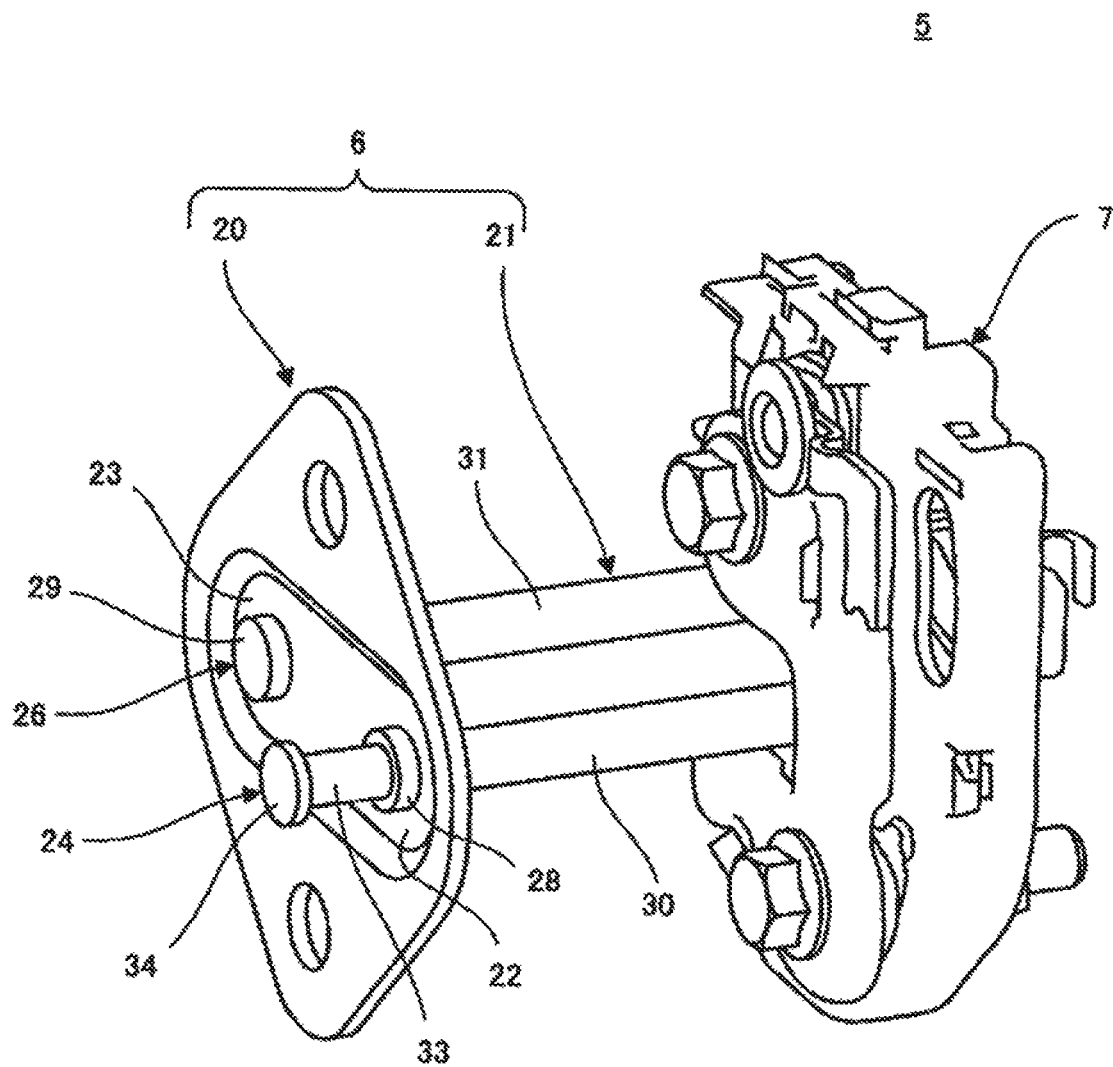
FIG. 2 is a perspective view of a seat lock device of FIG. 1.

FIG. 1 is a perspective view of an example of a seat for a vehicle for explaining an embodiment of the invention and FIG. 2 is a perspective view of a seat lock device provided in the seat for a vehicle of FIG. 1.

A seat 1 for a vehicle includes a seat cushion 2 which is a seat installed in a vehicle such as an automobile and supports the buttocks and thighs of an occupant (hereinafter referred to as a seated person) seated on the seat 1, a seat back 3 which supports the waist and back of a seated person, a seat belt 4 which restrains a seated person to the seat cushion 2 and the seat back 3, and a seat lock device 5.

The seat cushion 2 includes a metal frame (not illustrated) forming a frame of the seat cushion 2. The frame is covered with a cushion pad (not illustrated) made of a relatively soft resin foam material such as urethane foam and the cushion pad is covered with a trim cover 10 made of leather, woven fabric, or the like. The seat back 3 also includes a metal frame, a cushion pad covering the frame, and a trim cover 11 covering the cushion pad.

The seat back 3 is tiltable in a seat front-rear direction with respect to the seat cushion 2 around a tilt shaft 12 provided at a lower end portion of the seat back 3. The tilt shaft 12 is fixed to a vehicle body via a fixing bracket 13. The seat back 3 can be set to a reclined state where the seat back 3 is folded over the seat cushion 2 and a standing state illustrated in FIG. 1, and in the standing state, the seat back 3 is fixed to a vehicle body via the seat lock device 5.

The seat lock device 5 includes a striker 6 provided on the vehicle body and a lock unit 7 provided on a side portion of the seat back 3. The lock unit 7 has a latch (not illustrated) for locking the striker 6 and a lock releasing knob 8 linked with the latch. The lock releasing knob 8 is arranged on an upper surface of the seat back 3.

When the seat back 3 is raised from the reclined state, the striker 6 enters the lock unit and is locked by the latch. As a result, the seat back 3 is held in the standing state. When the lock releasing knob 8 is operated, the locking of the striker 6 by the latch is released, and thus the seat back 3 can be tilted from the standing state toward the reclined state.

Figure 3:
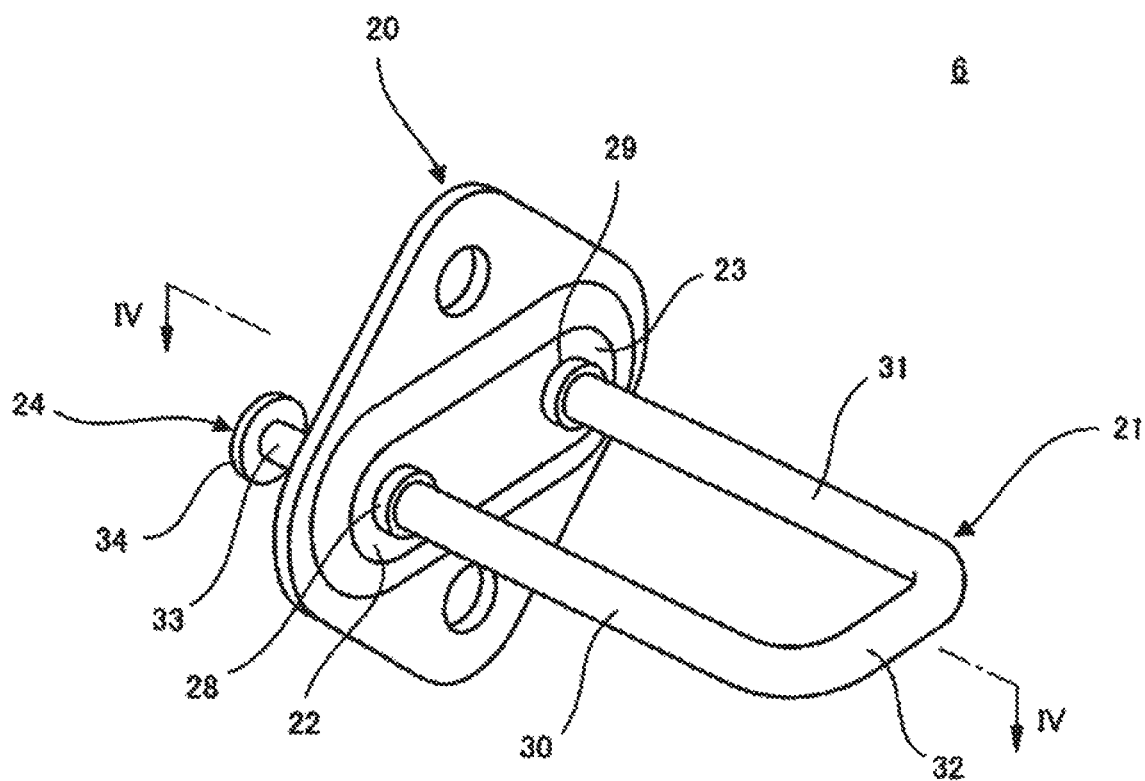
FIG. 3 is a perspective view of a striker of the seat lock device of FIG. 2.
Figure 4:
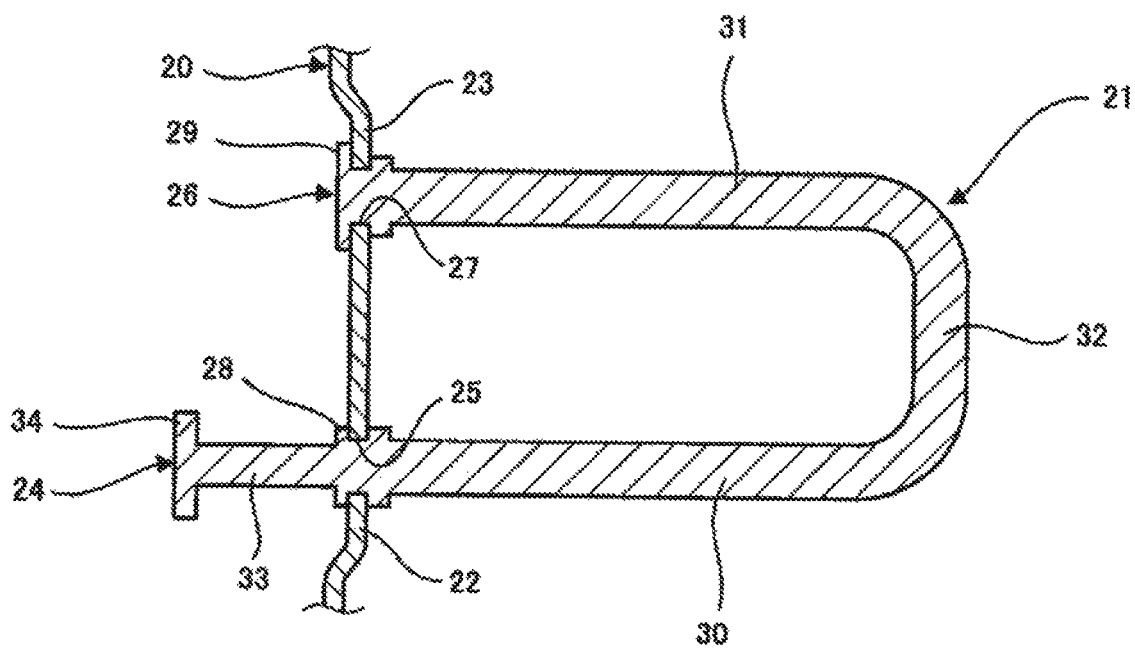
FIG. 4 is a cross-sectional view taken along the line IV-IV of the striker in FIG. 3.

FIGS. 3 and 4 illustrate the striker 6.

The striker 6 includes a base bracket 20 attached to the vehicle body and a rod 21 locked by the lock unit 7.

The base bracket 20 is a plate-shaped member made of a metal material such as a steel material and is fixed to the vehicle body by a fastening member such as a bolt, a rivet, and the like. The rod 21 is a bar-shaped member made of a metal material such as a steel material and is formed in a U shape.

The base bracket 20 has a first support portion 22 and a second support portion 23 for supporting both end portions of the rod 21 and the first support portion 22 and the second support portion 23 are spaced apart from each other in the seat front-rear direction. A through hole 25 through which a first end portion 24 of the rod 21 is inserted is formed in the first support portion 22 located on a seat front side among the first support portion 22 and the second support portion 23 and a through hole 27 through which a second end portion 26 of the rod 21 is inserted is formed in the second support portion 23 located on a seat rear side.

The first end portion 24 of the rod 21 has a fixing portion 28 and the fixing portion 28 is fixed to the first support portion 22 by pinching an edge portion of the through hole 25 formed in the first support portion 22 of the base bracket 20 in a thickness direction of the base bracket 20. The second end portion 26 of the rod 21 has a fixing portion 29 and the fixing portion 29 is fixed to the second support portion 23 by pinching an edge portion of the through hole 27 formed in the second support portion 23 of the base bracket 20 in the thickness direction of the base bracket 20. The fixing portion 28 and the fixing portion 29 are formed by caulking, for example.

The rod 21 formed in a U shape has a first shaft portion 30 extending from the first end portion 24, a second shaft portion 31 extending from the second end portion 26 in parallel with the first shaft portion 30, and a connecting portion 32 connecting the first shaft portion 30 and the second shaft portion 31. Of the first shaft portion 30 and the second shaft portion 31, the first shaft portion 30 located on a seat front side is locked by the lock unit 7. When the vehicle collides, for example, an upper body of a seated person abuts on the seat back 3 and a load resulting from the abutment between the upper body of the seated person and the seat back 3 is input to the first shaft portion 30 via the lock unit 7.

The fixing of the fixing portion 28 to the first support portion 22 is configured to be releasable when the load input to the rod 21 exceeds a predetermined load. The releasable fixation of the fixing portion 28 can be realized, for example, by reducing an overlap margin between the fixing portion 28 pinching the edge portion of the through hole 25 formed in the first support portion 22 and the edge portion of the through hole 25. Also, the first end portion 24 of the rod 21 further has an extension shaft portion 33 which extends to a front end side of the first end portion 24 more than the fixing portion 28 and a stopper portion 34. The stopper portion 34 is constituted by a flange provided at a tip end portion of the extension shaft portion 33.

Figure 5A:
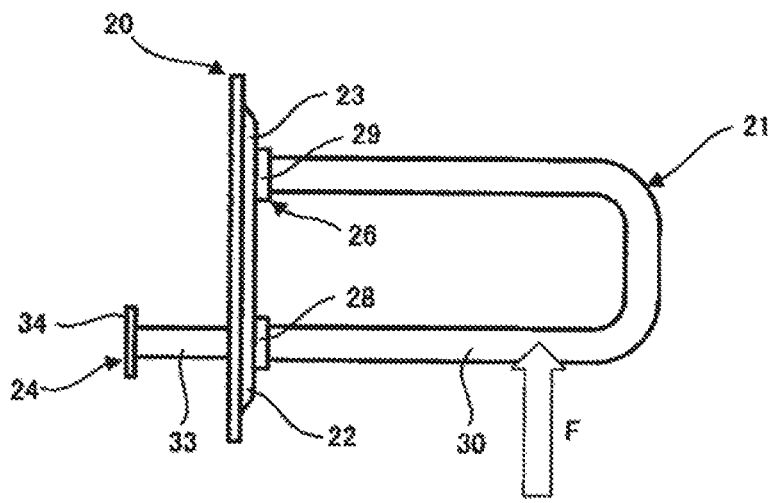
FIG. 5A is a plan view illustrating how the striker of FIG. 3 deforms when a load exceeding a predetermined load is applied.
Figure 5B:
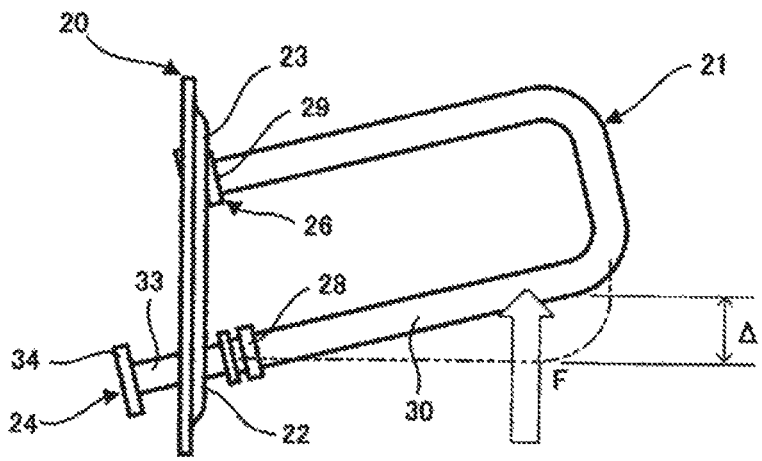
FIG. 5B is a plan view illustrating how the striker of FIG. 3 deforms when the load exceeding the predetermined load is applied.
Figure 5C:
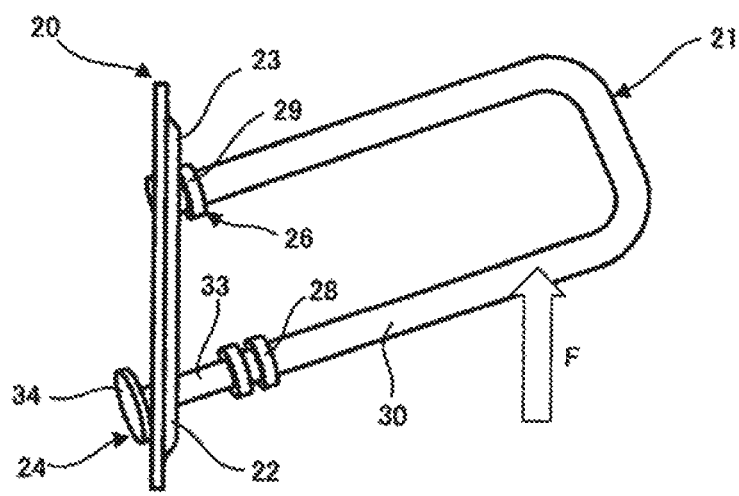
FIG. 5C is a plan view illustrating how the striker of FIG. 3 deforms when the load exceeding the predetermined load is applied.

FIGS. 5A to 5C illustrate how the base bracket 20 of the striker 6 configured as described above deforms when a load exceeding a predetermined load is applied.

The example illustrated in FIGS. 5A to 5C shows a case where a load F caused by the abutment between the upper body of the seated person and the seat back 3 is input to the rod 21 at the time of a vehicle rear collision and the load F exceeds a predetermined load. When the load F is input to the rod 21, fixation of the fixing portion 28 with respect to the first support portion 22 is released. As a result, the first end portion 24 of the rod 21 becomes a movable end portion movable with respect to the base bracket 20. On the other hand, fixation of the fixing portion 29 with respect to the second support portion 23 is maintained.

As illustrated in FIG. 5B, the rod 21 is inclined in an acting direction of the load F with the movement of the first end portion 24 which is a movable end portion and the extension shaft portion 33 of the first end portion 24 is disposed in the through hole 25 of the first support portion 22. Then, the edge portion of the through hole 25 is crushed by the extension shaft portion 33 and the through hole 25 is expanded. As described above, plastic deformation of the first support portion 22 further permits the movement of the first end portion 24 and deformation of the first support portion 22 also proceeds as the first end portion 24 moves.

In accordance with the deformation of the first support portion 22 and the movement of the first end portion 24, as illustrated in FIG. 5C, the stopper portion 34 provided in the extension shaft portion 33 of the first end portion 24 is engaged with the edge portion of the through hole 25 of the first support portion 22, and thus the extension shaft portion 33 is prevented from coming out of the through hole 25.

Figure 6:
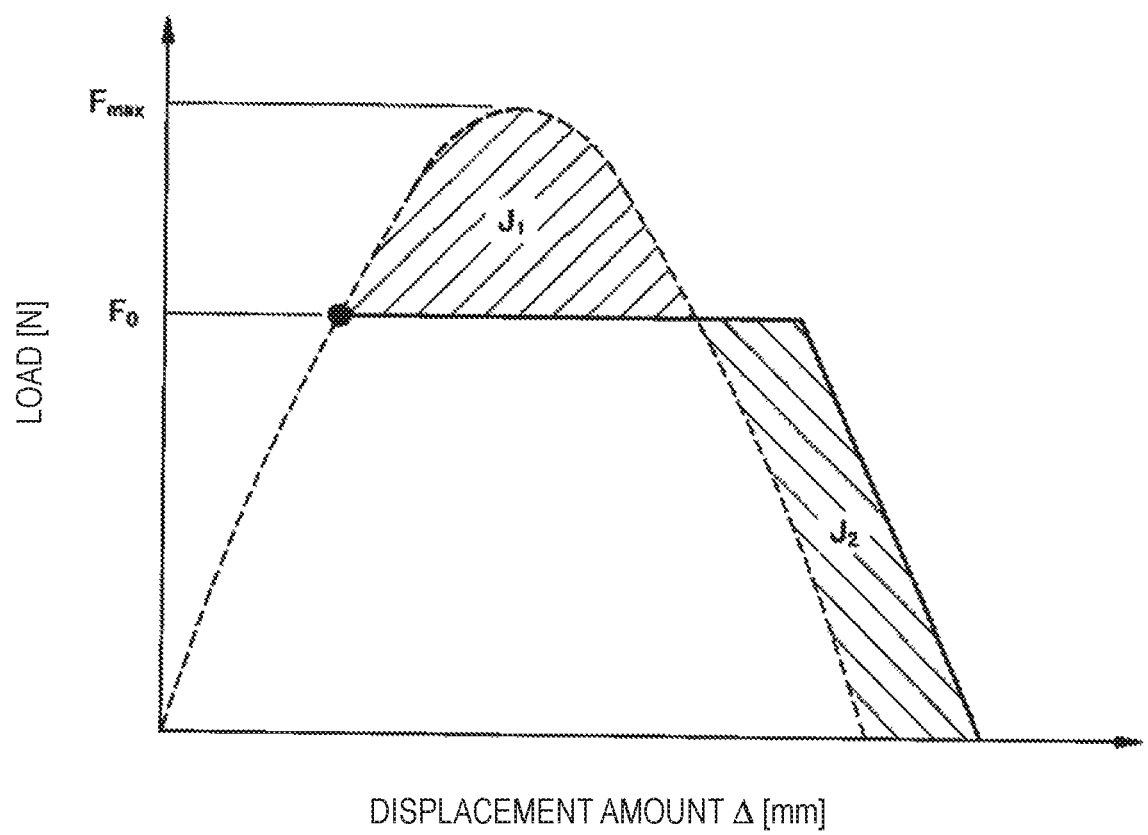
FIG. 6 is a graph illustrating an impact absorbed by the deformation of the striker illustrated in FIGS. 5A to 5C.

FIG. 6 illustrates an impact absorbed by deformation of the first support portion 22 of the base bracket 20. In FIG. 6, a horizontal axis represents a displacement amount Δ of the rod 21 tilted in the acting direction of the load F and a vertical axis represents a load applied to the rod 21.

In FIG. 6, a solid line indicates the load applied to the rod 21 when the first support portion 22 is deformed and a broken line indicates the load applied to the rod 21 when it is assumed that there is no deformation of the first support portion 22. The area of the region surrounded by the solid line and the area of the region surrounded by the broken line correspond to energy and are equal to the energy generated by the abutment between the upper body of a seated person and the seat back 3.

Assuming that a peak value $F_{max}$ of the load input to the rod 21 exceeds a predetermined load $F_0$ and there is no deformation of the first support portion 22, the load applied to the rod 21 reaches the peak value $F_{max}$. On the contrary, when the first support portion 22 deforms, the first support portion 22 starts deforming when the load input to the rod 21 reaches the predetermined load $F_0$ and the load applied to the rod 21 is suppressed to the predetermined load $F_o$.

When the first support portion 22 is deformed, a peak value of the load applied to the rod 21 becomes relatively small. However, as the first end portion 24 moves in accordance with the deformation of the first support portion 22, the displacement amount of the rod 21 becomes relatively large. An energy amount J1 corresponding to the decrease in the peak value of the load is compensated by an energy amount J2 corresponding to the increment of the displacement amount of the rod 21 and this energy amount J2 is consumed for deformation of the first support portion 22.

In this way, a part of the energy generated at the time of vehicle rear collision is consumed for deformation of the first support portion 22 of the base bracket 20 and the load applied to the rod 21 is suppressed to the predetermined load $F_o$. As a result, the impact can be absorbed by the seat lock device 5 and the impact to be received by a seated person can be alleviated. Further, the predetermined load $F_0$ is appropriately set based on a distance between the tilt shaft 12 and the seat lock device 5 and is, for example, 1300 N to 1600 N.

In addition, the stopper portion 34 engages the edge portion of the through hole 25 of the first support portion 22, and thus the extension shaft portion 33 is prevented from coming out of the through hole 25. As a result, even when an excessive load greatly exceeding the predetermined load $F_0$ is input to the rod 21, destruction of the striker 6 can be prevented and the seat back 3 can be held in the standing state.

Figure 7:
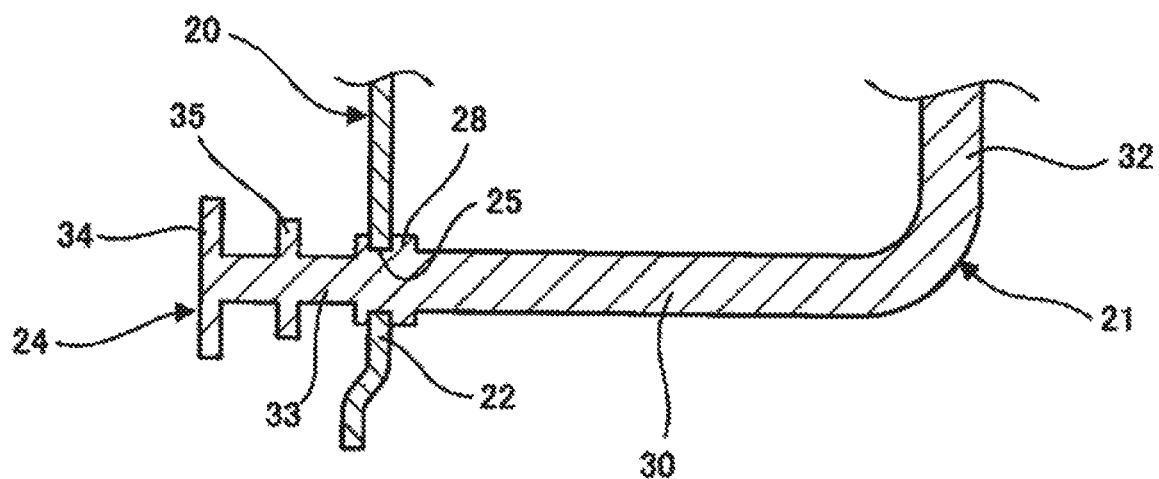
FIG. 7 is a cross-sectional view of a modification example of the striker of FIG. 3.
Figure 8:
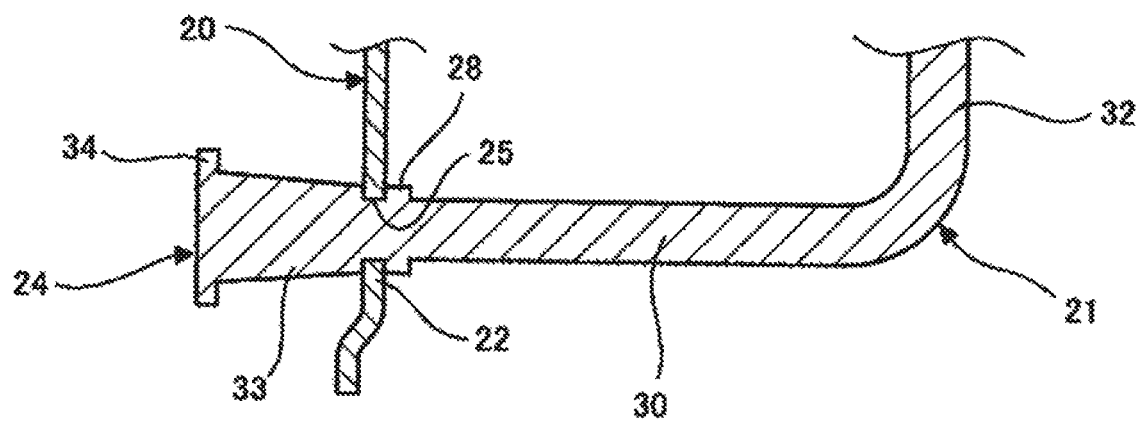
FIG. 8 is a cross-sectional view of another modification example of the striker of FIG. 3.
Figure 9:
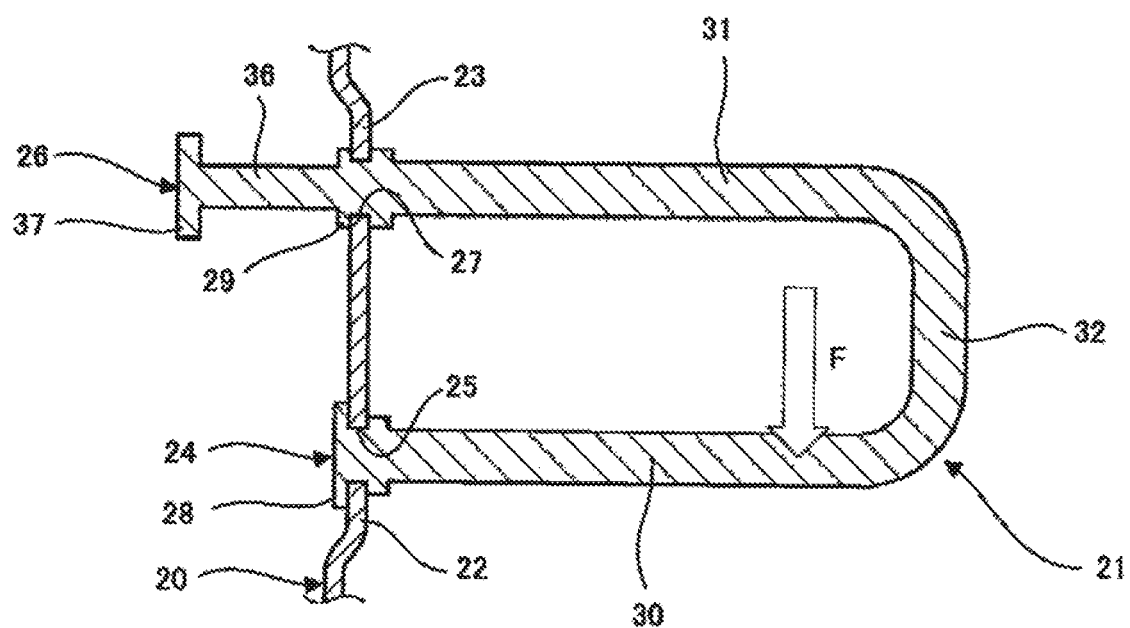
FIG. 9 is a cross-sectional view of still another modification example of the striker of FIG. 3.

FIGS. 7 to 9 illustrate modification examples of the striker 6.

In the example illustrated in FIG. 7, the first end portion 24 which is the movable end portion of the rod 21 has an engagement portion 35. The engagement portion 35 is provided in the extension shaft portion 33 between the fixing portion 28 and the stopper portion 34 and is formed larger than the fixing portion 28 and smaller than the stopper portion 34 in a cross section perpendicular to a central axis of the extension shaft portion 33.

Referring also to FIG. 5B, when the rod 21 tilts in the acting direction of the load F with the movement of the first end portion 24 which is the movable end portion, the edge portion of the through hole 25 formed in the first support portion 22 of the base bracket 20 is crushed by the extension shaft portion 33, and thus the through hole 25 is expanded. For the expanded through hole 25, the engagement portion 35 engages the edge portion of the through hole 25 and the deformation of the first support portion 22 becomes large as the engagement portion 35 passes through the through hole 25. Therefore, the energy consumed for deformation of the first support portion 22 can be increased and the impact can be further absorbed by the seat lock device 5.

A plurality of engagement portions 35 may be provided in the extension shaft portion 33. In this case, in two adjacent engagement portions 35, the engagement portion 35 disposed on the stopper portion 34 is formed to be larger than the engagement portion 35 disposed on the fixing portion 28.

Further, as illustrated in an example of FIG. 8, the extension shaft portion 33 may be formed into a tapered shape of which the diameter gradually increases as the extension shaft portion 33 extends from the fixing portion 28 toward the stopper portion 34. In the engagement portion 35, the first support portion 22 deforms in a stepwise manner, whereas according to the extension shaft portion 33 formed in a tapered shape, the first support portion 22 continuously deforms. Therefore, the impact can be absorbed smoothly by the seat lock device 5.

Also, as in an example illustrated in FIG. 9, the second end portion 26 of the rod 21 may be a movable end portion. That is, the fixing portion 29 of the second end portion 26 may be releasably fixed to the second support portion 23 of the base bracket 20 and the second end portion 26 may have an extended shaft portion 36 extending to a tip end side of the second end portion 26 further than the fixing portion 29 and the stopper portion 37.

At the time of a front collision, a load F due to the inertia acting on an upper body of a seated person is input to the rod 21. The rod 21 is tilted in the acting direction of the load F with the movement of the second end portion 26 which is the movable end portion and the edge portion of the through hole 27 is crushed by the extended shaft portion 36, and thus the through hole 27 is expanded. Plastic deformation of the second support portion 23 further permits the movement of the second end portion 26 and deformation of the second support portion 23 also proceeds as the second end portion 26 moves. In the example, a part of the energy generated at the time of the vehicle front collision is consumed for deformation of the second support portion 23 of the base bracket 20 and the load applied to the rod 21 is suppressed to a predetermined load. As a result, the impact can be absorbed by the seat lock device 5 and the impact to be received by a seated person can be alleviated.

An engagement portion similar to the engagement portion 35 illustrated in FIG. 7 may be provided in the extended shaft portion 36. In addition, as similar the extension shaft portion 33 illustrated in FIG. 8, the extended shaft portion 36 may be formed in a tapered shape of which the diameter gradually increases from the fixing portion 29 to the stopper portion 37.

Also, although not illustrated, both end portions of the first end portion 24 and the second end portion 26 of the rod 21 may be used as movable end portions. In either case of vehicle rear collision or vehicle front collision, the impact can be absorbed by the seat lock device 5 and the impact to be received by a seated person can be alleviated.

Figure 10:
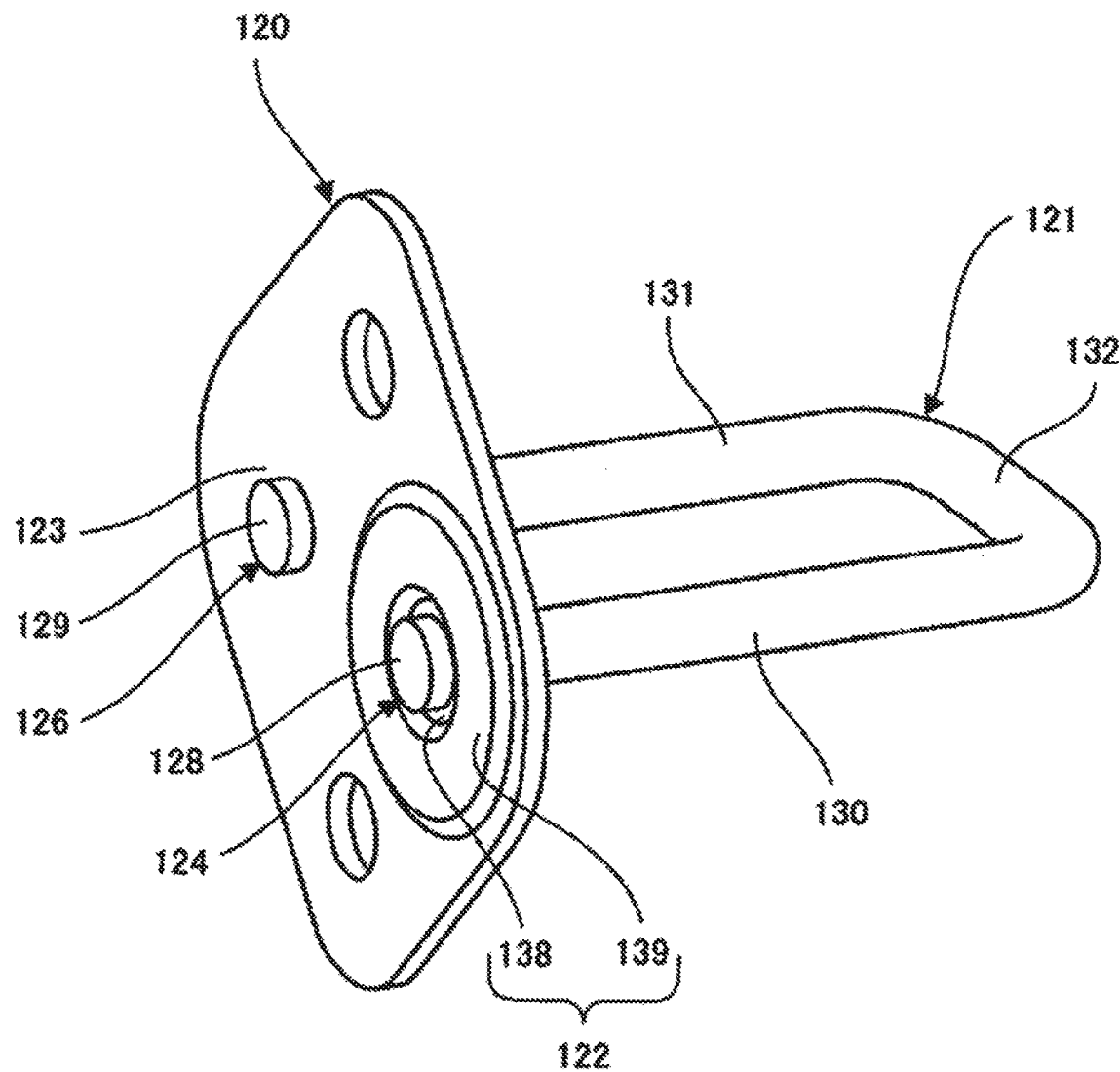
FIG. 10 is a perspective view illustrating another example of the striker of the seat lock device for explaining an embodiment of the invention.

FIG. 10 illustrates another example of the striker of the seat lock device for explaining the embodiment of the invention.

A striker 106 illustrated in FIG. 10 includes a plate-shaped base bracket 120 attached to a vehicle body and a U-shaped rod 121 locked by the lock unit 7 (see FIG. 2).

The base bracket 120 has a first support portion 122 and a second support portion 123 for supporting both end portions of the rod 121 and the first support portion 122 and the second support portion 123 are disposed at intervals in the seat front-rear direction. The first support portion 122 located on the seat front side of the first support portion 122 and the second support portion 123 has a through hole 125 through which a first end portion 124 of the rod 121 is inserted and the second support portion 123 located on the seat rear side has a through hole through which a second end portion 126 of the rod 121 is inserted.

The first end portion 124 of the rod 121 has a fixing portion 128 fixed to the first support portion 122 of the base bracket 120 and the second end portion 126 of the rod 121 has a fixing portion 129 fixed to the second support portion 123 of the base bracket 120. The rod 121 includes a first shaft portion 130 extending from the first end portion 124, a second shaft portion 131 extending parallel to the first shaft portion 130 from the second end portion 126, and a connecting portion 132 connecting the first shaft portion 130 and the second shaft portion 131. Of the first shaft portion 130 and the second shaft portion 131, the first shaft portion 130 disposed on the seat front side is locked by the lock unit 7.

The first support portion 122 has a fixed portion 138 in which the through hole 125 is formed and an annular-shaped pleating portion 139 surrounding an outer periphery of the fixed portion 138. The pleating portion 139 is formed in a circular corrugated shape with the fixed portion 138 as the center thereof and extends when the load input to the rod 121 exceeds a predetermined load.

Figure 11A:
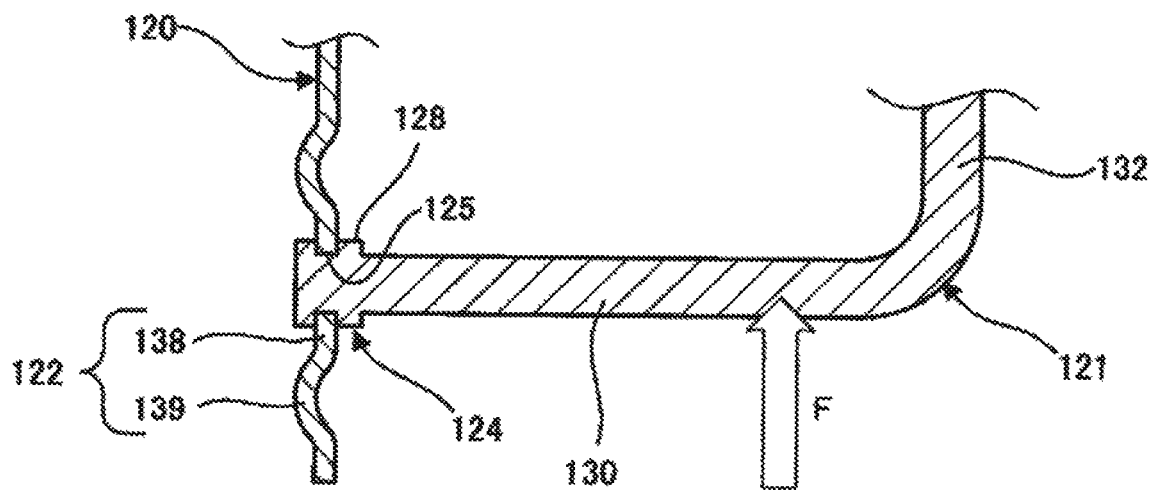
FIG. 11A is a cross-sectional view illustrating how the striker of FIG. 10 deforms when a load exceeding a predetermined load is applied.
Figure 11B:
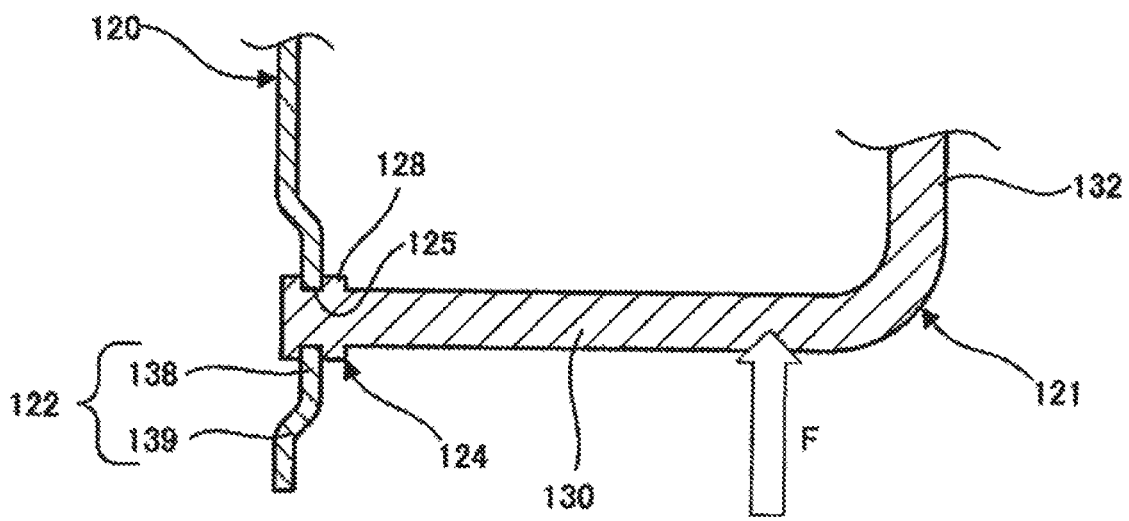
FIG. 11B is a cross-sectional view illustrating how the striker of FIG. 10 deforms when the load exceeding the predetermined load is applied.

FIGS. 11A and 11B illustrate how the base bracket 120 of the striker 106 configured as described above deforms when a load exceeding a predetermined load is applied.

The example illustrated in FIGS. 11A and 11B illustrates a case where, at the time of a vehicle rear collision, the load F resulting from the abutment between an upper body of a seated person and the seat back 3 is input to the rod 121, and the load F exceeds a predetermined load. When the load F is input to the rod 121, the first support portion 122 is deformed so that the pleating portion 139 extends, and in accordance with the deformation of the first support portion 122, the first end portion 124 of the rod 121 is moved with respect to the base bracket 120, and then the rod 121 tilts in the acting direction of the load F with the movement of the first end portion 124 which is the movable end portion. In this example, both the fixing of the fixing portion 128 to the first support portion 122 and the fixing of the fixing portion 129 to the second support portion 123 are maintained with respect to the input of the load F. According to this example as well, a part of the energy generated at the time of vehicle rear collision is consumed for deformation of the first support portion 122 of the base bracket 120, and thus the load applied to the rod 121 is suppressed to a predetermined load. As a result, the impact can be absorbed by the seat lock device 5 and the impact to be received by the seated person can be alleviated.

Figure 12:
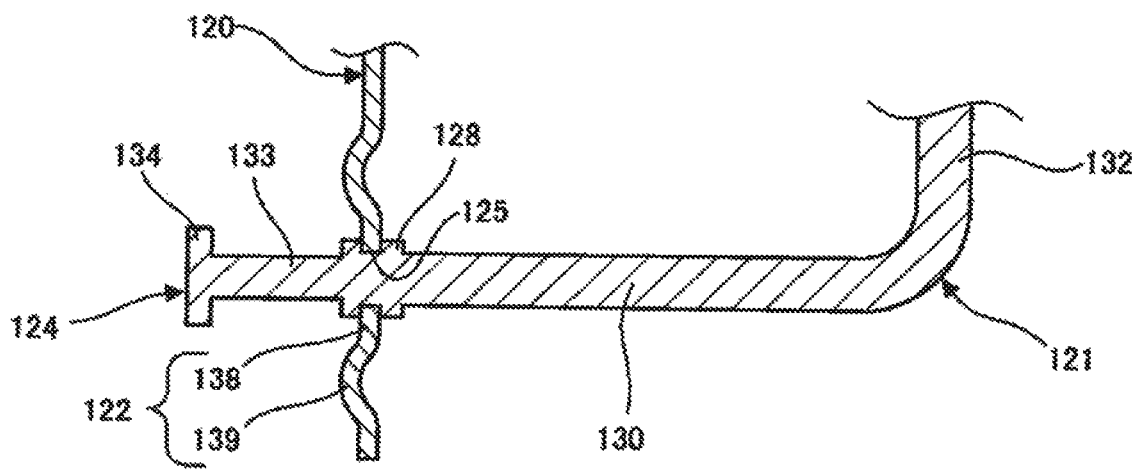
FIG. 12 is a cross-sectional view of a modification example of the striker in FIG. 10.

FIG. 12 illustrates a modification example of the striker 106.

In an example illustrated in FIG. 12, the first end portion 124 which is the movable end portion of the rod 121 further has an extended shaft portion 133 extending to the tip end side of the first end portion 124 further than the fixing portion 128 and a stopper portion 134. In addition, fixation of the fixing portion 128 to the first support portion 122 is configured to be releasable when the load input to the rod 121 exceeds the predetermined load.

In this example, when a load F exceeding the predetermined load is input to the rod 121, the first support portion 122 is deformed so that the pleating portion 139 extends. Further, the fixation of the fixing portion 128 to the first support portion 122 is released and the extended shaft portion 133 of the first end portion 124 is disposed in the through hole 125 of the first support portion 122. Then, the edge portion of the through hole 125 is crushed by the extended shaft portion 133 and the through hole 125 is expanded. The deformation of the first support portion 122 is increased by extending the pleating portion 139 and further deforming the first support portion 122 so as to expand the through hole 125, in such a manner that the energy consumed for the deformation of the first support portion 122 can be increased. As a result, the impact can be further absorbed by the seat lock device 5.

An engagement portion similar to the engagement portion 35 in FIG. 7 may be provided in the extended shaft portion 133. Further, as similar to the extension shaft portion 33 illustrated in FIG. 8, the extended shaft portion 133 may be formed in a tapered shape of which the diameter gradually increases as the extended shaft portion 133 extends from the fixing portion 128 to the stopper portion 134.

Further, the second end portion 126 of the rod 121 may be used as a movable end portion. That is, the second support portion 123 of the base bracket 120 may have a pleating portion similar to the pleating portion 139 of the first support portion 122. In this case, a part of the energy generated at the time of the vehicle front collision is consumed for deformation of the second support portion 123 of the base bracket 120 and the load applied to the rod 121 is suppressed to a predetermined load. As a result, the impact can be absorbed by the seat lock device 5 and the impact to be received by a seated person can be alleviated. Further, both end portions of the first end portion 124 and the second end portion 126 of the rod 121 may be used as movable end portions. In this case, in either case of vehicle rear collision or vehicle front collision, the impact can be absorbed by the seat lock device 5 and the impact to be received by the seated person can be alleviated.

Hereinbefore, the invention is described with reference to the seat 1 installed in a vehicle such as an automobile or the like. However, the invention can also be applied to a seat for a vehicle other than a vehicle such as a ship or an aircraft.

As described above, a seat lock device disclosed in the description includes a striker installed in a vehicle body and a lock unit provided on a seat back tiltable in a seat front-rear direction and holding the seat back in a standing state by locking the striker, where the striker includes a base bracket attached to the vehicle body and a U-shaped rod locked by the lock unit and the base bracket has two support portions which respectively support end portions of the rod with a space therebetween in the seat front-rear direction, and further at least one of the support portions deforms when a load exceeding a predetermined load is input to the rod so as to permit movement of the end portion of the rod supported by the support portion with respect to the base bracket.

Further, in the seat lock device disclosed in the description, the deformable support portion has a through hole through which the end portion of the rod is inserted and a movable end portion of the rod supported by the deformable support portion has a fixing portion releasably fixed to an edge portion of the through hole and a shaft portion extending to a tip end side of the movable end portion further than the fixing portion, and further a hole edge portion of the through hole is crushed by the shaft portion when the support portion is deformed and the through hole is expanded.

In the seat lock device disclosed in the description, in the movable end portion, a stopper portion which engages with the hole edge portion crushed by the shaft portion is provided in a tip end portion of the movable end portion.

In the seat lock device disclosed in the description, the shaft portion has an engagement portion which is larger than the fixing portion and smaller than the stopper portion in a cross section perpendicular to a central axis of the shaft portion.

In the seat lock device disclosed in the description, the shaft portion has a plurality of the engagement portions and the engagement portion disposed on a stopper portion of the two adjacent engagement portions is larger than the engagement portion disposed on a fixing portion.

In the seat lock device disclosed in the description, the shaft portion is formed in a tapered shape of which the diameter gradually increases as the shaft portion extends from the fixing portion to the stopper portion.

In the seat lock device disclosed in the description, the deformable support portion has a fixed portion to which the end portion of the rod is fixed and a pleating portion which has an annular shape and surrounds an outer periphery of the fixed portion and the pleating portion is stretched when the support portion is deformed.

What is claimed is:

1. A seat lock device comprising:
   a striker installed in a vehicle body; and
   a lock unit provided on a seat back tiltable in a seat front-rear direction and holding the seat back in a standing state by locking the striker, wherein:
   the striker includes a base bracket attached to the vehicle body and a U-shaped rod locked by the lock unit;
   the base bracket has first and second support portions which respectively support first and second end portions of the rod with a space therebetween in the seat front-rear direction, wherein the first end portion is supported in a through hole of the first support portion;
   at least the first of the support portions deforms when a load exceeding a predetermined load is input to the rod so as to permit movement of the first end portion of the rod supported by the first support portion with respect to the base bracket,
   the first end comprises a first collar forming a fixing portion, a second collar forming an engaging portion, and a third collar forming a stopper portion,
   each of the collars protrudes radially outward from a central shaft of the rod, and
   the third collar is larger than the second collar and the second collar is larger than the first collar for progressively greater resistance as the first end portion is pulled through the through hole in the first support portion.

2. The seat lock device according to claim 1, wherein:
   the first end portion is a movable end portion of the rod supported by the deformable support portion and has the fixing portion releasably fixed to an edge portion of the through hole and a shaft portion extending to a tip end portion of the movable end portion further than the fixing portion; and
   a hole edge portion of the through hole is crushed by the shaft portion when the support portion is deformed and the through hole is expanded.

3. The seat lock device according to claim 2, wherein, in the movable end portion, the stopper portion which engages with the hole edge portion crushed by the shaft portion is provided in the tip end portion of the movable end portion.

4. The seat lock device according to claim 3, wherein the shaft portion has the engagement portion which is larger than the fixing portion and smaller than the stopper portion in a cross section perpendicular to a central axis of the shaft portion.

5. The seat lock device according to claim 4, wherein:
   the shaft portion has a plurality of the engagement portions comprising at least a portion of the fixing portion and at least a portion of the stopper portion; and
   the engagement portion comprised of at least the portion of the stopper portion is larger than the engagement portion comprised of at least the portion of the fixing portion.

* * * * *